(12) United States Patent
Mackey (10) Patent No.: US 7,857,928 B1
(45) Date of Patent: Dec. 28, 2010

(54) COVER UP

(76) Inventor: Lloyd Mackey, 636 Lenox Ave., Daytona Beach, FL (US) 32118

( * ) Notice: Subject to any disclaimer, the term of this patent is extended or adjusted under 35 U.S.C. 154(b) by 788 days.

(21) Appl. No.: 11/729,379

(22) Filed: Mar. 28, 2007

Related U.S. Application Data (60) Provisional application No. 60/791,835, filed on Apr. 13, 2006.

(51) Int. Cl.
*B29C 65/00* (2006.01)

(52) U.S. Cl. .................. 156/94; 428/34.5; 428/34.6; 428/34.7; 427/140; 427/142

(58) Field of Classification Search .............. 156/94; 427/140, 142; 428/34.5–34.7; 180/219; 280/770
See application file for complete search history.

(56) References Cited

U.S. PATENT DOCUMENTS

| | | | |
|---|---|---|---|
| 191,262 A | 5/1877 | Stevens | |
| 1,662,018 A | 3/1928 | Orman | |
| 1,718,623 A | 6/1929 | Zuker | |
| 2,795,523 A | 6/1957 | Cobb et al. | 154/104 |
| 3,137,933 A | 6/1964 | Hitchcock et al. | 29/401 |
| 3,419,949 A | 1/1969 | Huebner | 29/401 |
| 3,930,068 A * | 12/1975 | Sloan | 427/140 |
| 4,255,845 A * | 3/1981 | Henderson | 29/402.02 |
| 4,404,244 A | 9/1983 | Springston | 428/109 |
| 4,519,856 A | 5/1985 | Lazzara | 156/49 |
| 4,662,959 A * | 5/1987 | Morgan | 156/94 |
| 4,775,561 A | 10/1988 | Barnett | 428/35 |
| 4,858,853 A | 8/1989 | Westerman et al. | 244/119 |
| 5,884,380 A | 3/1999 | Thurm | 29/401.1 |
| 6,543,426 B1 * | 4/2003 | Schwochert | 123/516 |
| 2003/0044553 A1 | 3/2003 | Ramanathan et al. | 428/35.8 |
| 2006/0226626 A1 * | 10/2006 | Dehn et al. | 280/220 |
| 2008/0083577 A1 * | 4/2008 | Schmidt et al. | 180/219 |

* cited by examiner

*Primary Examiner*—Richard Crispino
*Assistant Examiner*—Christopher Schatz
(74) *Attorney, Agent, or Firm*—Brian S. Steinberger; Law Offices of Brian S. Steinberger, P.A.

(57) ABSTRACT

Methods, systems and devices for providing a shell cover to cover up an existing motorcycle fuel tank, and methods of installing the cover on the motorcycle fuel tank. The process allows the fuel tank to remain on the motorcycle without being removed. The fuel tank surface can be prepped by filling in indentations on the tank surface. Tank surfaces having only cosmetic damage, only punctures or having combinations of both cosmetic damage and punctures can be fixed. Next, a slurry and/or adhesive can be applied to the exterior tank surface and a cover is then placed over the fuel tank. The cover can be made from a plastic or fiberglass type material and can be painted to resemble the original motorcycle fuel tank.

7 Claims, 8 Drawing Sheets

COVER UP

This invention claims the benefit of priority to U.S. Provisional Patent Application Ser. No. 60/791,835 filed Apr. 13, 2006.

FIELD OF INVENTION

This invention relates to motorcycle gas tanks, and in particular to protective covers and shells for motorcycle gas tanks and methods of making, and installing covers for protecting motorcycle gas tanks.

BACKGROUND AND PRIOR ART

Motorcycle fuel tanks often become dented, scratched and marred over time. Repairing the metal tank can be difficult and expensive. To repair a dented tank will generally require the tank be physically removed from the motorcycle. Then the tank surface must be properly prepped, and the dents pulled out. Next, the tank will need to be totally painted. The motorcycle owner will have the expense of having the motorcycle repaired by a shop and have to pay hourly rates charged by these shops. Thus, removal, repair and painting the tank is a time consuming and expensive proposition.

An alternative to repairing the damaged tank is to fully replace the tank with a new tank. However, the old tank would still need to be removed, and the customer would still have the expense of having to by a new fuel tank for the motorcycle, and the hourly shop costs that result. New motorcycle tanks can cost many hundreds of dollars by themselves.

Various other types of techniques have been proposed over the years. See for example, U.S. Pat. Nos. 1,662,018 to Orman; 4,662,959 to Morgan; 4,775,561 to Barnett; and 5,884,380 to Thurm.

Orman describes a temporary rubber type "leakproof tank cover", title, that a temporary fix or cover, and would not be aesthetically pleasing to others. Morgan and Barnett each describe applying a patch type sheet to a tank. These processes do not allow for the exterior of the patches to resemble that of an existing motorcycle tank, and are also difficult to install and use.

Thurm describes a method of attaching a motorcycle gas tank cover, title, generally requires the removal of existing bolt fasteners 38, 40 and flanges on the existing motorcycle gas tank, column 5. This mechanical removal and reattachment technique is both time consuming and not easy to do while the existing motorcycle tank is on a motorcycle. The Thurm technique allows for using ribbing material such as foam type strips between the cover and the existing tank, which does not create a tight complete fit since there are air space strips that must remain between the motorcycle and cover and the existing tank. These compressible foam type strips also allow for the cover to be able to move, slide, and potentially bang against the existing tank, which is also undesirable.

Thus, the need exists for solutions to the above problems with the prior art.

SUMMARY OF THE INVENTION

A primary objective of the present invention is to provide a method, system and device designed as a permanent repair for Motorcycle Fuel Tanks that have been damaged or are in poor repair due to neglect by their owners.

A secondary objective of the present invention is to provide a method, system and device of repairing a motorcycle fuel tank so that a person with little or no experience in sheet metal work or in body repair can perform his own repair and restore his fuel tank to an almost exact replica of his original equipment.

A third objective of the present invention is to provide a method, system and device of repairing a motorcycle fuel tank that will save the motorcycle owner the expense of having the motorcycle repaired by a shop and having to pay hourly rates charged by these shops, and in the case of a repair shop can cut down the amount of time it takes to repair a fuel tank by hand or save the expense of having to by a new fuel tank for the motorcycle, decreasing overhead and increasing net profit.

A fourth objective of the present invention is to provide a method, system and device of repairing a motorcycle fuel tank that will allow repairs while the fuel tank is still on the motorcycle allowing the owner of the motorcycle to use his motorcycle for transportation if needed.

A fifth objective of the present invention is to provide a method, system and device of repairing a motorcycle fuel tank where the tank can be painted to match the motorcycles paint prior to installing and eliminate having to wait for a freshly painted surface to dry before being able to use the motorcycle.

A sixth objective of the present invention is to provide a method, system and device of repairing a motorcycle fuel tank that can be used to repair dented, scratched, rusted and even side and top punctures on motorcycle fuel tanks.

A seventh objective of the present invention is to provide a method, system and device of repairing a motorcycle fuel tank that will also add strength to existing fuel tanks that have been repaired in the past.

A preferred embodiment can include a method for protecting and covering motorcycle gas tanks, comprising the steps of providing a preformed shell cover with a closed upper and outer sides with open bottom, the cover conforming to an upper surface of a motorcycle gas tank, cleaning and prepping the upper surface of the gas tank, lining substantially all of the upper surface of the gas tank with a sealer, and mounting the shell cover over and about the upper surface of the gas tank so that substantially all clearance space between upper surface of the gas tank and the shell cover are filled with the sealer; and sealing the cover to the gas tank.

The providing step further can include painting the shell cover to match that of the motorcycle gas tank before mounting the cover to the gas tank. The providing, cleaning, lining, positioning and sealing steps can occur while the gas tank is attached to a motorcycle.

The cleaning and prepping step can includes the step of filling in indentations and dents and scratches on the upper surface of the gas tank with a filler so that the upper surface of the gas tank has a smooth contiguous surface.

The sealer can include a liquid resin affixing material. The sealer can include a slurry of mixed chopped, stranded material such as fiberglass and resin.

The providing step can include molding the shell cover from fiberglass. The providing step can include stamping the shell cover from aluminum. The providing step can include casting the shell cover from plastic.

The cleaning and prepping step can include the step of covering a cosmetic mark on the motorcycle gas tank. The cleaning and prepping step can include the step of patching a puncture in the motorcycle gas tank. The cleaning and prepping step can include the steps of both covering a cosmetic mark on the motorcycle gas tank, and patching a puncture in the motorcycle gas tank.

The preformed shell cover can have an outside dimension having dimensions of approximately ⅛ of an inch to approximately ¼ of an inch larger than the outer surface of the motorcycle gas tank.

The cleaning and prepping step can include the step of sanding substantially all of the surface of the motorcycle gas tank to form a rough outer surface.

The novel method can also be used for fixing large punctures to motorcycle gas tanks by removing the gas tank, and following the general process steps previously described. Afterward, the motorcycle gas tank with cover can be turned upside down, a filler can be poured into to any space that is left between the motorcycle gas tank and the cover, which is then cured, followed by remounting the gas tank with the cover onto the motorcycle.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Figures 1, 2:
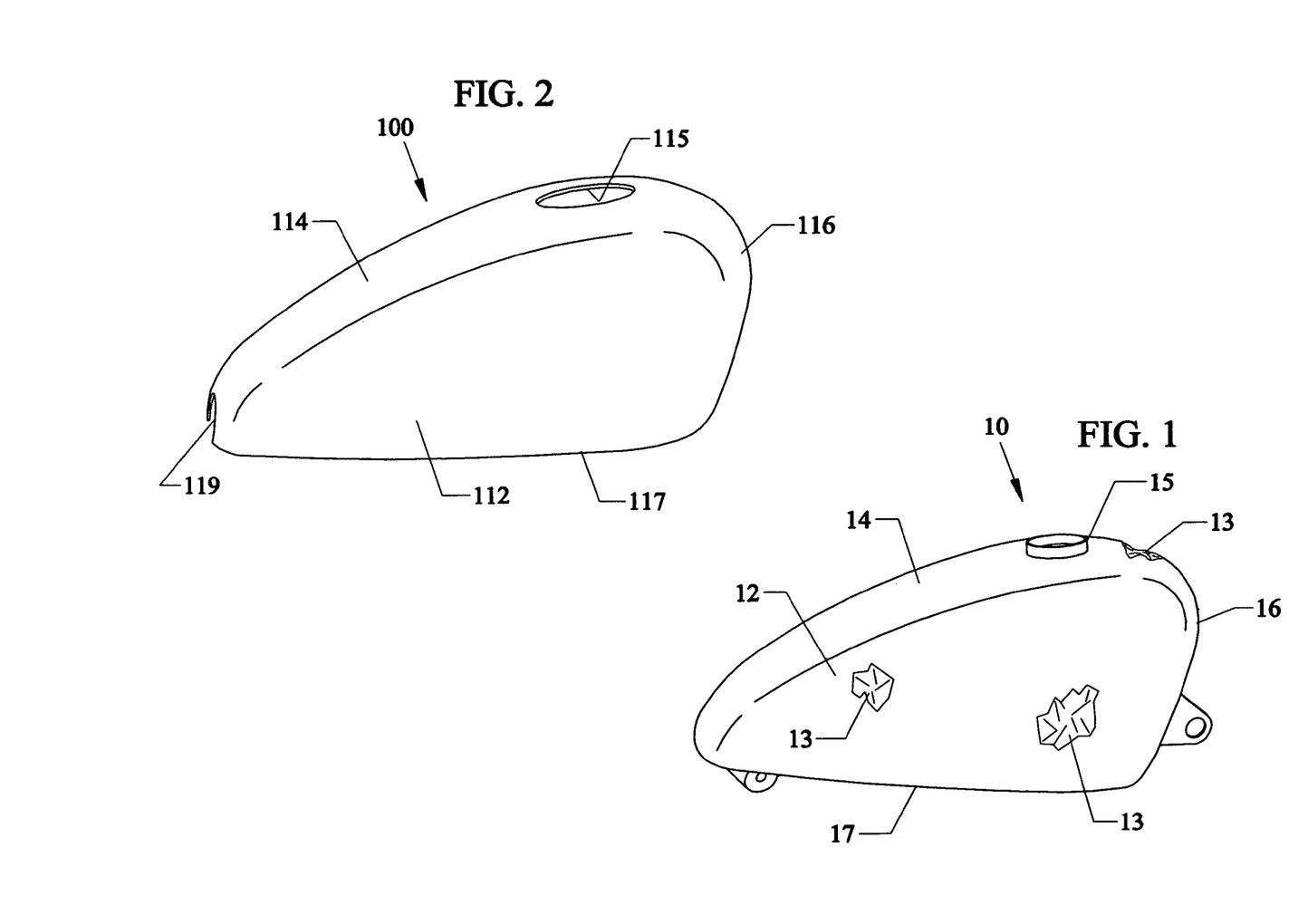
FIG. 1 shows a perspective view of a motorcycle fuel tank.
FIG. 2 is a perspective view of the novel invention tank cover

The components in the figures will now be defined.
10 Existing motorcycle fuel tank
12 side of existing motorcycle fuel tank
13 damage/scratches/indentations on motorcycle fuel tank
14 angled top of existing motorcycle fuel tank
15 cap for motorcycle fuel tank
16 front end of existing motorcycle fuel tank
17 bottom edge of existing fuel tank
100 novel motorcycle tank cover
112 sides of novel tank cover
113 hollow inside space of novel tank cover
114 angled top of novel tank cover
115 opening in top of tank cover for fuel cap
116 front end of novel tank cover
117 bottom edge of novel tank cover
119 curved indentation on back on tank cover
200 motorcycle
210 motorcycle seat
212 front end of motorcycle seat FIG. 1 shows a perspective view of a motorcycle fuel tank 10, that can have an oblong shape with opposite side walls 12, an upwardly angled top surface 14 with a screwable gas cap 15 to allow for fueling inside of the tank 10. Tank 10 can have a blunt curved front end 16 and bottom edge 17 about the perimeter of the tank 10.

FIG. 2 is a perspective view of the novel invention tank cover 100 that can also have a similar oblong shape with opposite side walls 112, and bottom edge 117 about a hollow inside portion 113. Tank cover 100 can include a rear end with curved indentation 119 that allows for the tank cover to wrap about a front seat end portion 212 shown more clearly in FIG. 7. Tank cover 100 has a similar upwardly angled top surface 114 with an opening 115 large enough to fit about gas cap 15 on the existing tank 10, along with a blunt curved front end 116 similar to that of the tank 10.

Figure 3:
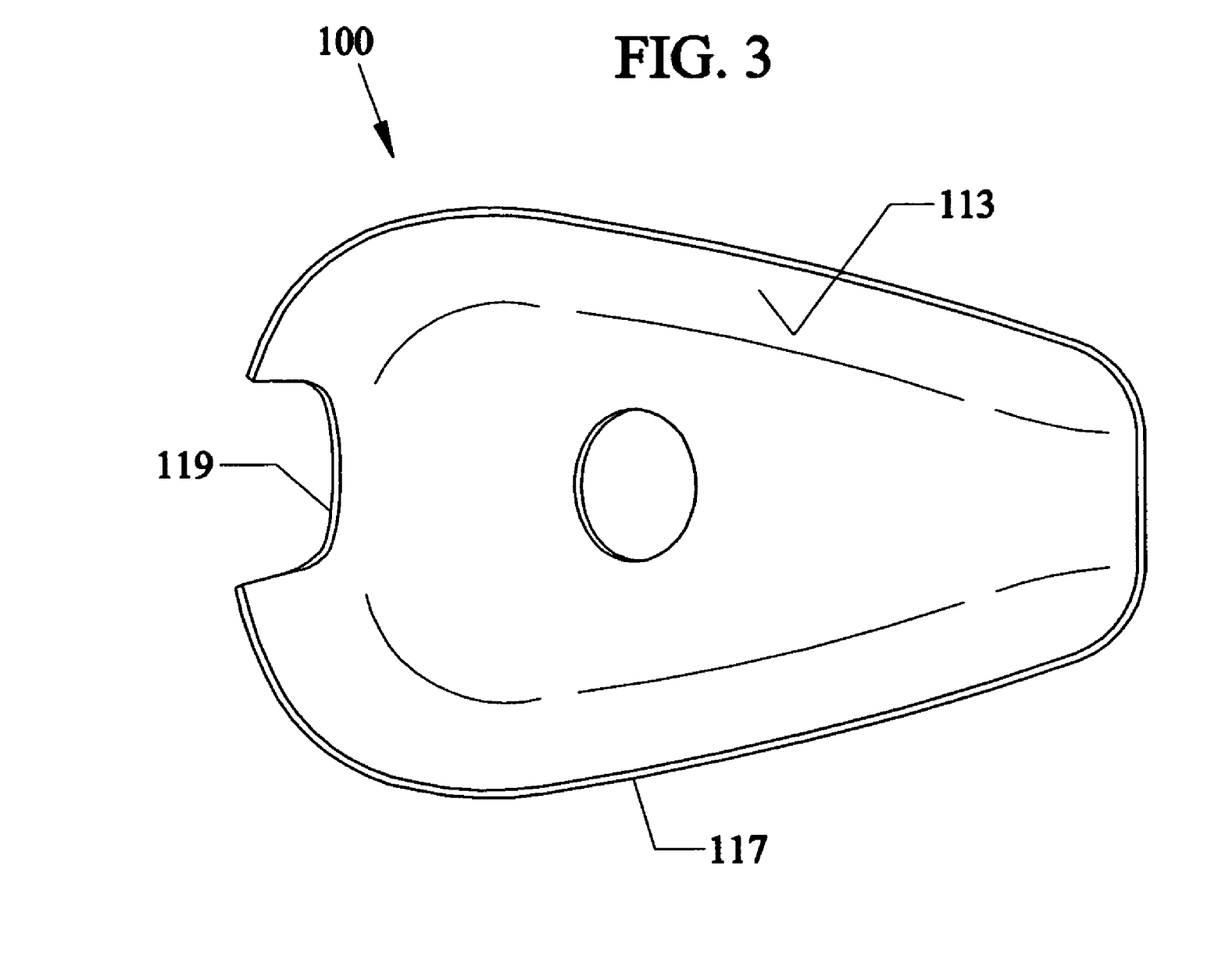
FIG. 3 shows the underside of the novel tank cover.

FIG. 3 shows the underside of the novel tank cover 100 where the inner surface 113 can have a smooth surface and be shaped to closely conform to the outer surface of the tank 10.

Figure 4:
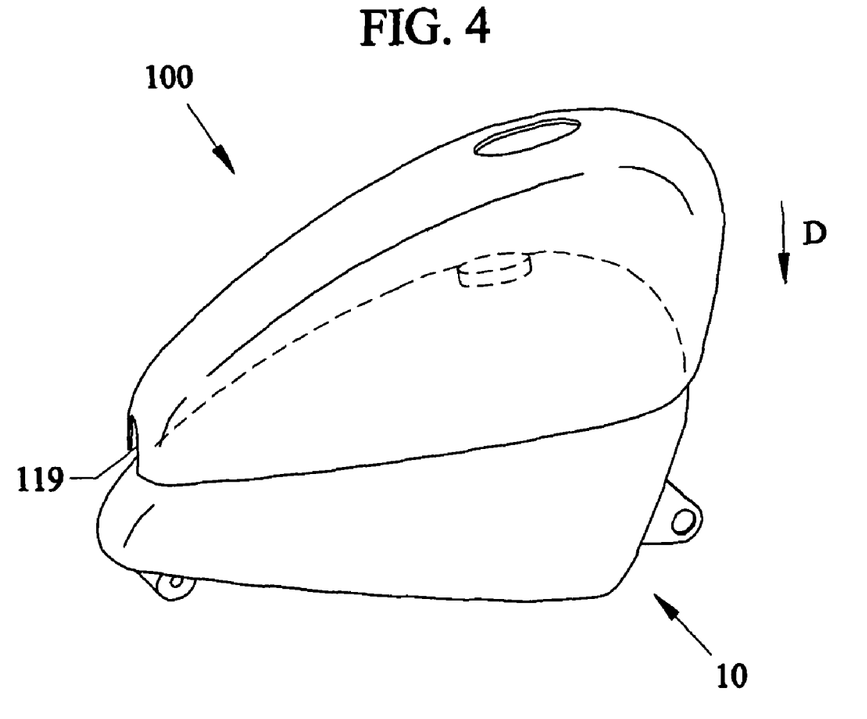
FIG. 4 shows the novel tank cover being placed over and about the motorcycle fuel tank.
Figure 5:
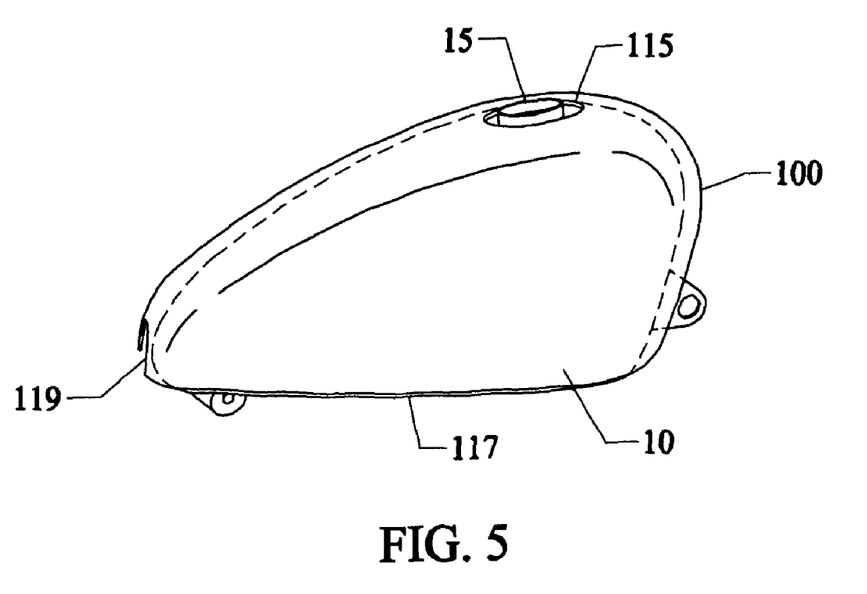
FIG. 5 shows the cover up on the motorcycle fuel tank.
Figure 6:
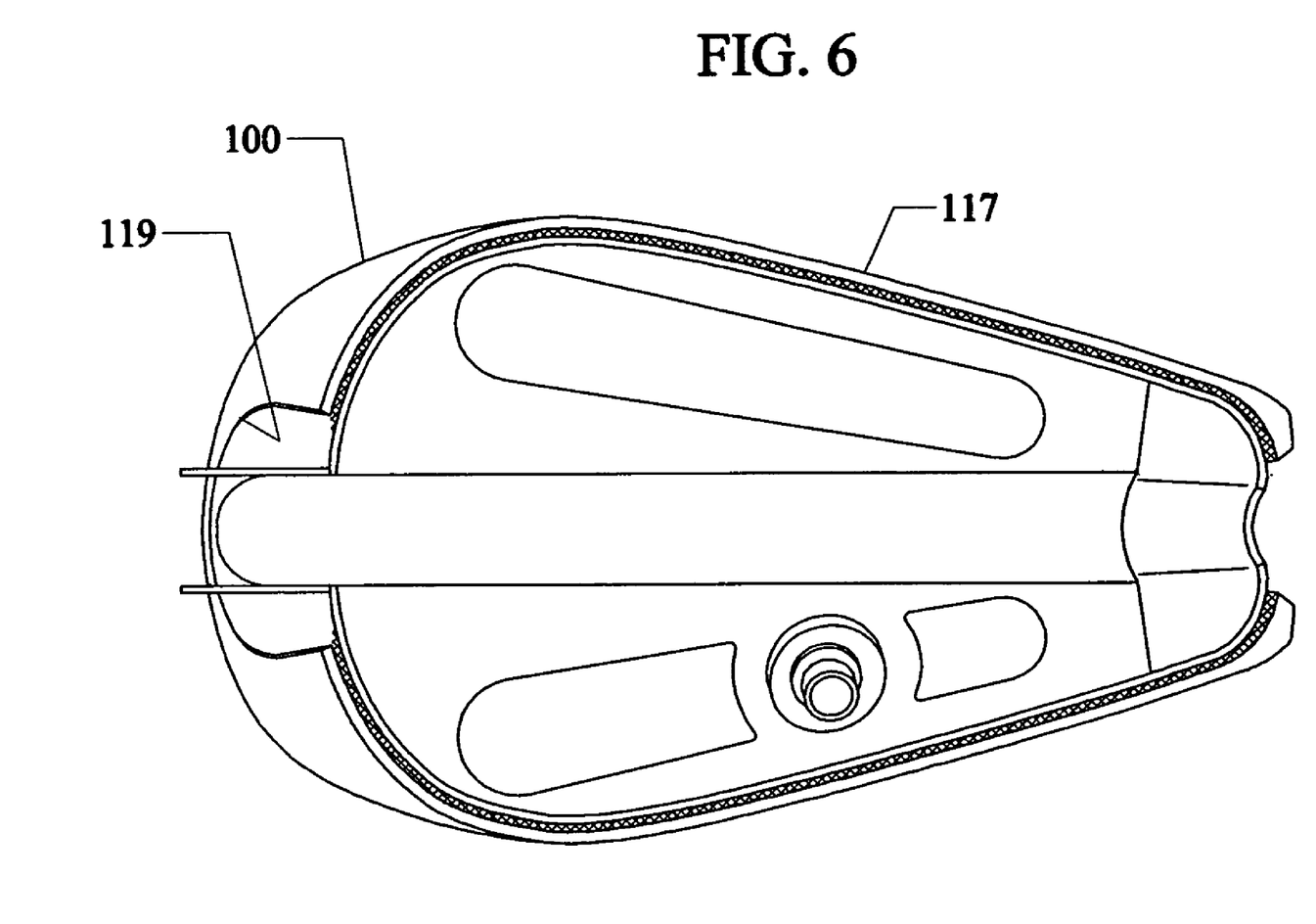
FIG. 6 shows the bottom of the novel cover up on the tank.

FIG. 4 shows the novel tank cover 100 being placed over and about the motorcycle fuel tank 10. FIG. 5 shows the novel tank cover 100 on the motorcycle fuel tank 10 after being moved downward in the direction of arrow D. FIG. 6 shows the bottom of the tank cover on the existing motorcycle tank.

Figure 7:
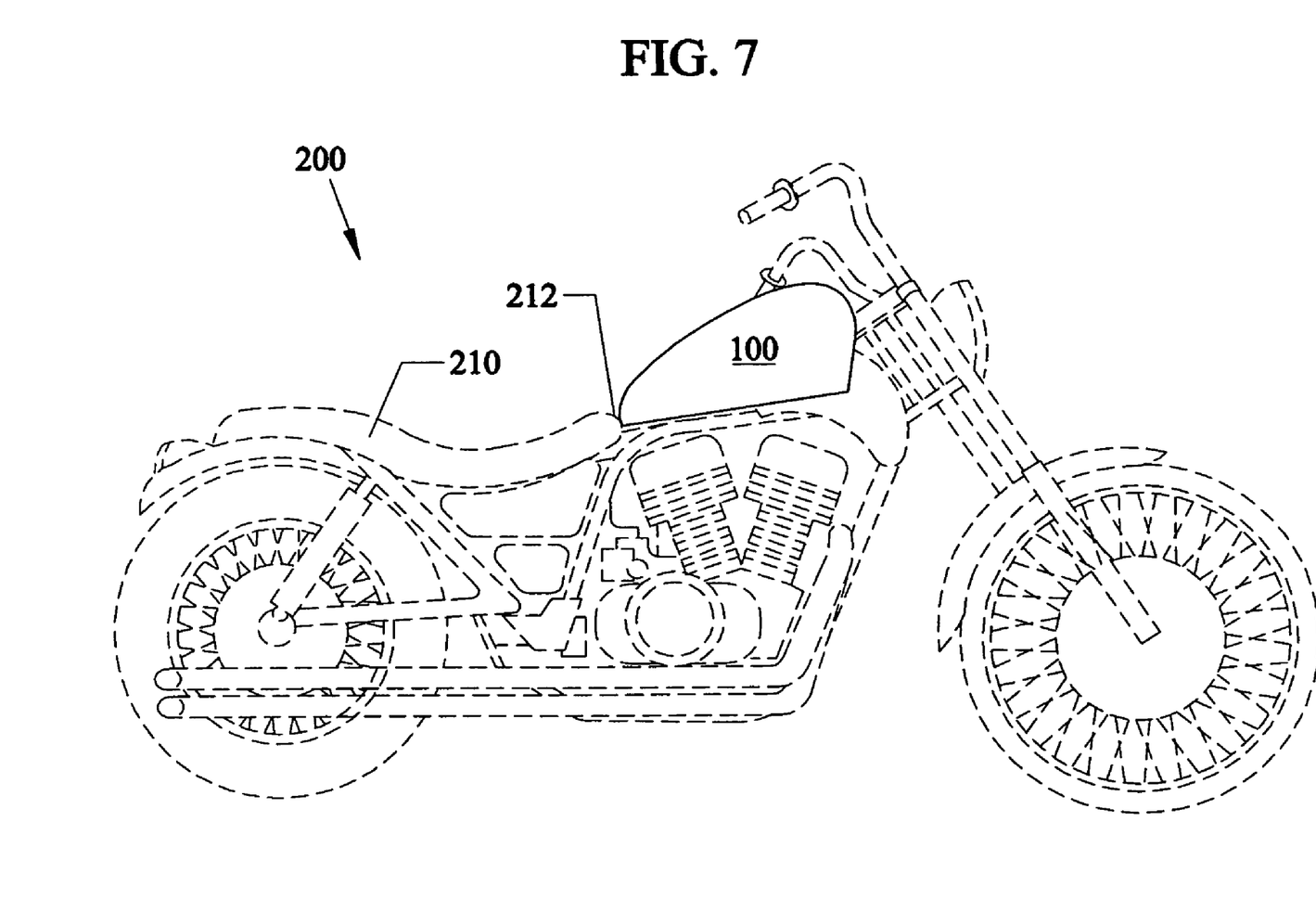
FIG. 7 shows the novel tank cover installed on a motorcycle.

FIG. 7 shows the novel tank cover 100 installed on a motorcycle 200. The novel tank cover 100 fits over the existing motorcycle tank 100, where the curved cut-out 119 in the rear of the tank cover 100 can fit over and about the front end 212 of the motorcycle seat 210.

Referring to FIGS. 1-7, the novel tank cover 100 can be placed over the motorcycle tank 10 such that a clearance gap 113 is formed between an upper surface of the motorcycle tank 10 and an inner surface of the tank cover 100, wherein said clearance gap is either approximately ⅛-inch or approximately ¼-inch.

The novel tank cover can have an overall exterior dimension that can be either approximately ⅛-inch or approximately ½-inch overall larger than the outer dimensions of the existing original motorcycle fuel tank 10. This space between the existing tank 10 and novel tank cover is to allow for the use of a liquid resin affixing material or a slurry of mixed chopped, stranded material such as fiberglass and resin to mount the tank cover 100 permanently to the fuel tank 100 that is being repaired.

The novel tank cover 100 can be constructed from various materials including but not limited to epoxy or polyester resins added to fabrics such as e-glass fiberglass fabric, s-2 fiberglass fabric, knytex mat, baltek mat, aramid mat, graphite carbon mat and carbon fiber mat. The tank cover 100 can also be stamped from aluminum or cast from plastic.

As previously described the tank cover 100 can consist of a duplicate of the original tank 10 that is to be repaired by merely adding either approximately ⅛-inch or approximately ¼-inch to the overall interior dimensions depending on the type of repair.

Figure 8:
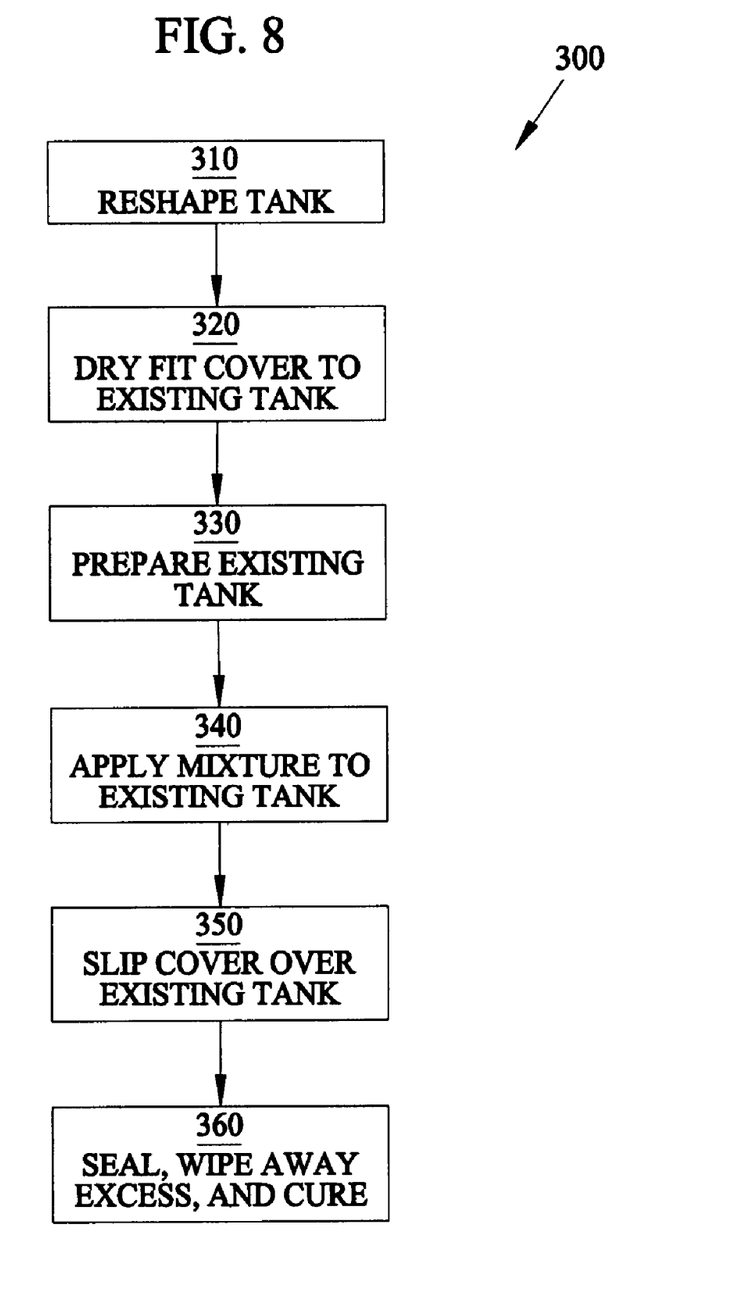
FIG. 8 is a flowchart of installation steps for a cosmetic repair of a motorcycle tank.

FIG. 8 is a flowchart of installation steps for a cosmetic repair of a motorcycle tank. For a cosmetic repair the approximately ⅛-inch larger or the approximately ¼-inch overall model would be used depending on the severity of the damage. This repair can be accomplished while the tank is still attached to the motorcycle by first lightly tapping the sheet metal of the existing tank 10 into the closest resemblance of the original tank as possible using a wooden or rubber mallet to reduce the risk of sparks, 310

Under step 320, it will be necessary to dry fit the novel tank cover 100 onto the existing tank 10 using no resin or affricative to ensure proper fit before making the repair permanent, 330. A basic shell can be preformed by molding and the like, to fit about the existing motorcycle tank. Once the basic shape has been achieved the entire outer surface of the existing tank 10 will be prepped, 330. The outer surface of the existing tank 10 can be ruffed up using approximately 60 to approximately 100 grit sandpaper to ensure proper adhesion of the resin.

Once this has been accomplished, under step 340, the installer will mix and begin spreading a slurry mixture of chopped fiberglass or other chopped stranded material and resin evenly over the surface of the existing tank 10 to be repaired. Once the slurry mixture has been applied, the installer will then simply slip the novel tank cover 100 to be placed over the existing tank 10, in step 350. Finally, in step 360, the installer then applies by hand a small amount of pressure to the outside of the novel tank cover 100 to insure a complete seal over the existing tank 10, while wiping the excess slurry from the bottom 117 of the tank cover 100 as necessary and allowing the resin to cure per the manufacturers guide.

Figure 9:
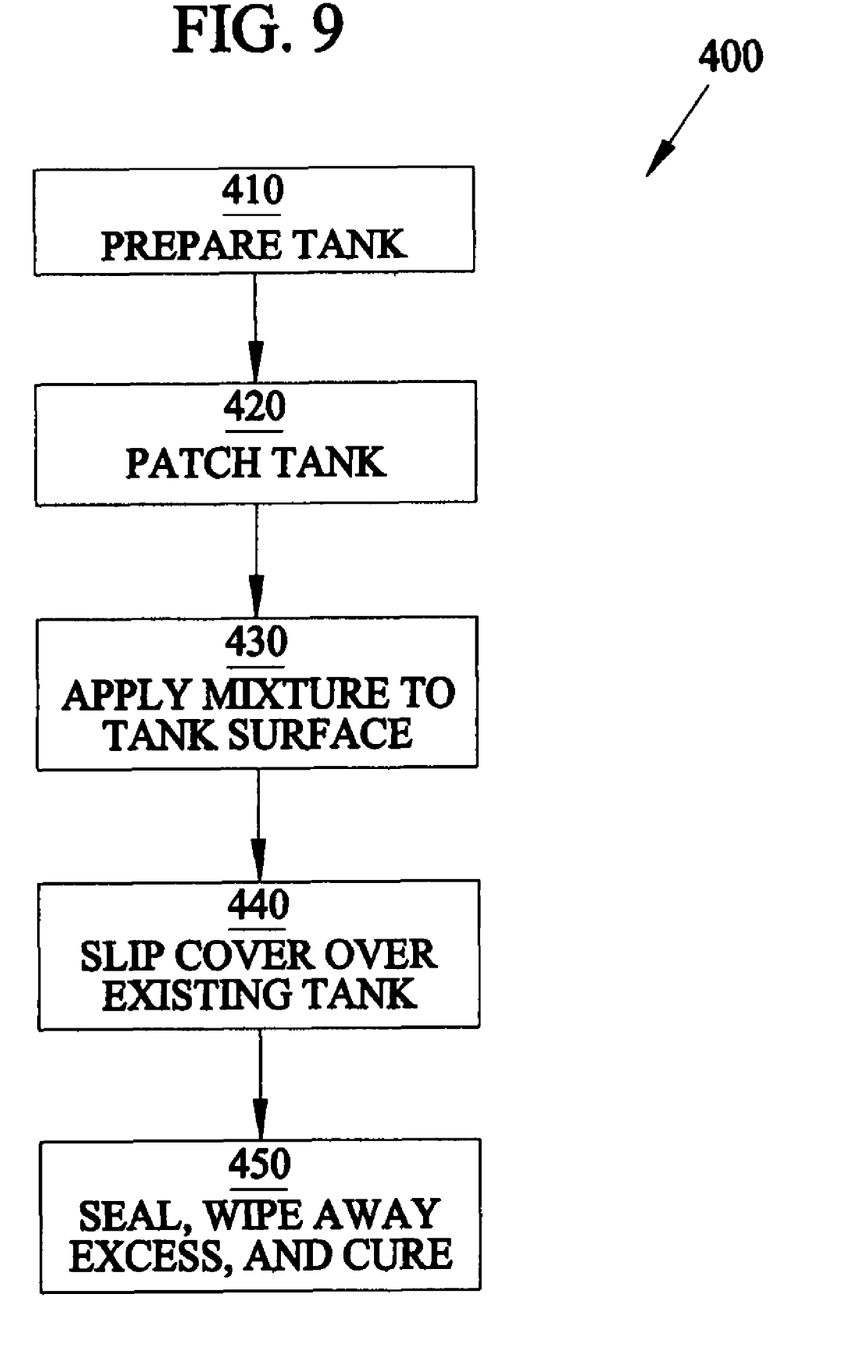
FIG. 9 is a flowchart of installation steps for a minor puncture repair of a motorcycle tank.
Figure 10:
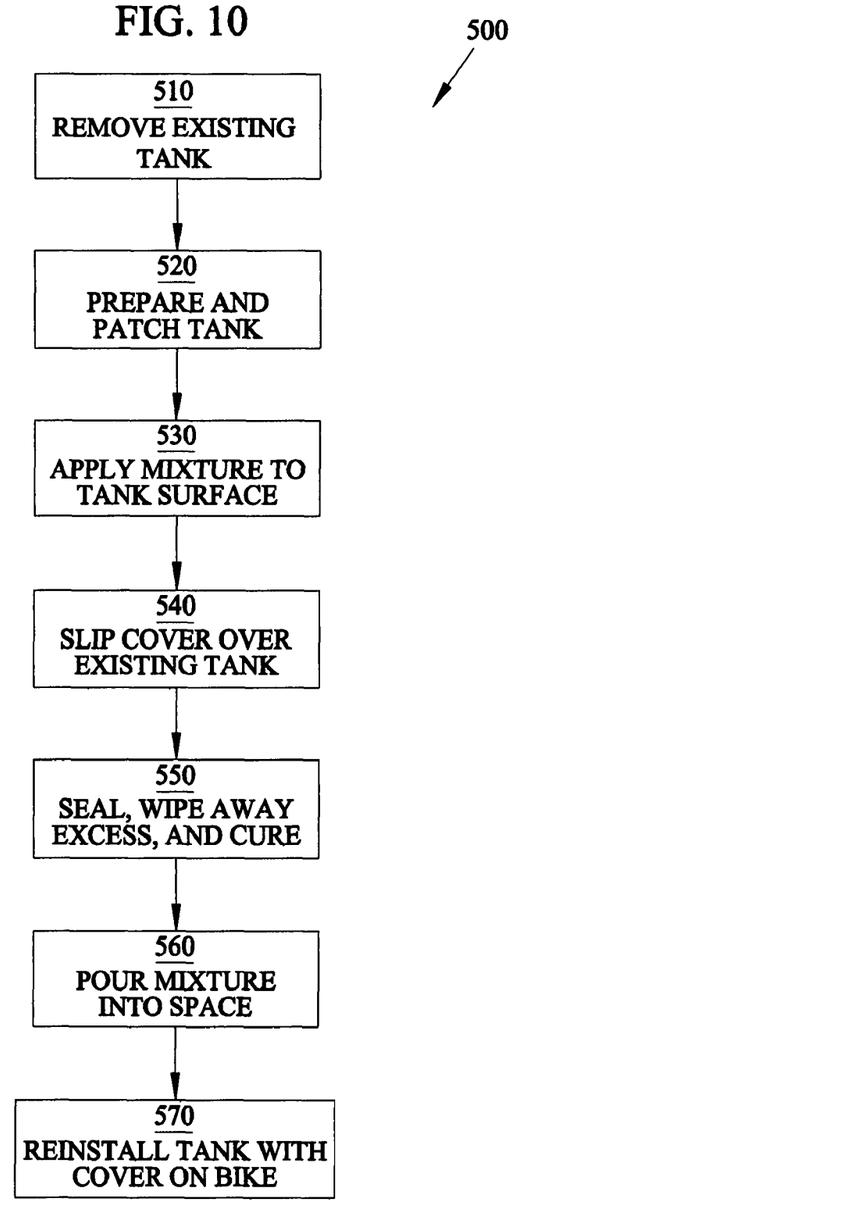
FIG. 10 is a flowchart of installation stepps for a major puncture repair to a tank.

For the repair of a Motorcycle tank that may have been punctured there are two possible avenues of repair, a minor repair FIG. 9, and a major repair FIG. 10.

Referring to FIG. 9, for a minor puncture repair, the approximately ⅛-overall tank cover model can be used. In the first step, the tank 10 can be prepared by removing all fuel from the fuel tank, and the area of the puncture has been allowed to dry, the area around the puncture has been prepared to the bare metal using a coarse grade of sand paper such as approximately 80 to approximately 150 grit, and then cleaned using dewaxer/degreaser in the area of the puncture.

Next, under step 420, the small puncture can be patched using a slurry of epoxy resin (or other resin that is not effected by petroleum products once cured) and chopped stranded material such as fiberglass would be spread over the affected area and allowed to cure for the proper length of time according to the manufactures guide lines. Once the patch has cured and is permanent a slurry of epoxy resin and a stranded chopped material such as fiberglass would be spread evenly over the entire surface of the tank, step 430. Followed by the novel cover 100 being slipped into place, 440, followed with a small amount of pressure being applied and the excess resin being wiped from the bottom edges 117 of the tank cover 100, and the slurry is then allowed to dry, step 450.

FIG. 10 is a flowchart of installation steps for a major puncture repair to a tank. For larger punctures the motorcycle tank may have to be removed and taken to a shop to be welded or braised, 510. Off-the-shelf patch products, such as those referenced in the background section of the invention (such as U.S. Pat. Nos. 1,662,018 to Orman; 4,662,959 to Morgan; 4,775,561 to Barnett; and 5,884,380 to Thurm, each of which is incorporated by reference), and the like, can be used, for initially covering the puncture, 520. Once the patch has been put in place the approximately ¼-inch overall model can be used to perform the next step.

Under step 530, a small amount of slurry will be mixed and applied to those areas of the cover up that will need to be sealed to prevent resin from leaking during the next phase ie: around mounting brackets, fuel inlets and fuel valves. Before the slurry has began to set the installer then places the novel cover 100 over the existing fuel tank 100, step 540. To insure the seal of these areas by applying a small amount of the slurry to outside of these areas and wiping away the excess as necessary, step 550.

Once the slurried areas have began to set up or harden on the tank 10 with the tank cover 100 applied, the tank with cover is flipped up side down and the installer will notice an approximately ⅛-inch gap on all sides between the tank 10 and the tank cover 100. This space will now be filled by mixing epoxy or polyester resin and pouring carefully into the surrounding cavity, 560. Allowing the resin to cure per the manufactures guide lines before moving the tank to the upright position will ensure a permanent repair, and the tank with cover is then reinstalled onto the motorcycle 570.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for repairing, protecting and covering motorcycle gas tanks, comprising the steps of: providing a motorcycle with a motorcycle gas tank attached thereon; forming a single preformed shell cover with a closed upper side with a single opening for a fuel cap, and closed outer sides and with an open bottom, the preformed shell cover completely conforming to an upper surface of the motorcycle gas tank and being a replica of the upper surface of the motorcycle gas tank; cleaning and prepping the upper surface of the gas tank by filling in indentations and dents and scratches on the upper surface of the gas tank with a filler so that the upper surface of the gas tank has a smooth contiguous surface; lining substantially all of the upper surface of the gas tank with a sealer; and permanently mounting the shell cover over and about the upper surface of the gas tank to create a clearance gap between an inner surface of the shell cover and the upper surface of the gas tank, said clearance gap being approximately ¼ of an inch or approximately ⅛ of an inch, wherein substantially all gap clearance space between the upper surface of the gas tank and the inner surface of shell cover are filled with the sealer that includes a slurry of mixed chopped, stranded fiberglass and resin; and permanently sealing the cover to the motorcycle gas tank, wherein the steps of cleaning and prepping, and lining, and mounting and sealing occur while the motorcycle gas tank remains attached to the motorcycle, and the steps of mounting and sealing occur without the use of separate fasteners.

2. The method of claim 1, wherein the providing step further includes the step of:
   painting the shell cover to match that of the motorcycle gas tank before mounting the cover to the gas tank.

3. The method of claim 1, wherein the providing step includes the step of:
   molding the shell cover from fiberglass.

4. The method of claim 1, wherein the cleaning and prepping step includes:
   covering a cosmetic mark on the motorcycle gas tank.

5. The method of claim 1, wherein the cleaning and prepping step includes the step of: patching a puncture in the motorcycle gas tank.

6. The method of claim 1, wherein the cleaning and prepping step includes the steps of both:
   covering a cosmetic mark on the motorcycle gas tank; and
   patching a puncture in the motorcycle gas tank.

7. The method of claim 1, wherein the cleaning and prepping step includes the step of: sanding substantially all of the surface of the motorcycle gas tank to form a rough outer surface.

* * * * *